UNITED STATES PATENT OFFICE.

MAX FREMERY, OF OBERBRUCH, AND EMIL BRONNERT, OF MÜLHAUSEN-NIEDERMORSCHWEILER, GERMANY, AND JOHANN URBAN, OF ST. PÖLTEN, AUSTRIA-HUNGARY.

PROCESS FOR MANUFACTURING FILMS OR THREADS OF CELLULOSE.

No. 804,191.     Specification of Letters Patent.     Patented Nov. 7, 1905.

Application filed May 8, 1905. Serial No. 259,478.

*To all whom it may concern:*

Be it known that we, MAX FREMERY, residing at Oberbruch, Province of the Rhine, and EMIL BRONNERT, residing at Mülhausen-Niedermorschweiler, Alsace, in the German Empire, both subjects of the German Emperor, and JOHANN URBAN, a subject of the Emperor of Austria-Hungary, residing at St. Pölten, in the Empire of Austria-Hungary, have invented certain new and useful Improvements in Processes for Manufacturing Films or Threads of Cellulose, of which the following is a specification.

It has been proposed by us to manufacture forms of cellulose containing copper by treating ammoniacal cupriferous solutions of cellulose with an alkali, for such forms are in high degree waterproof in comparison with the forms of cellulose free from copper, which are obtained when similar cellulose solutions are treated with an acid or by preferably weak caustic soda and washing with an acid for removing all the copper.

If the cupriferous forms of cellulose are treated directly after their coagulation or precipitation with acids or bases for the purpose of separating the copper, their valuable properties are lost and they assume the properties of cellulose forms coagulated by an acid.

By this invention cupriferous forms of cellulose—such as threads, films, or the like—are made by injecting in the known manner solutions of cellulose in ammoniacal cupriferous solutions into strong caustic-alkali solution and afterward immersing the forms thus produced for some time, such as for half an hour or one hour or longer, in a cold strong solution of caustic alkali—for instance, a solution containing not less than twenty per cent. of caustic soda. This solution may be that into which the cellulose solution was injected in order to produce the form, in which case it will contain a little ammonia. The ammonia is advantageous provided it does not exceed about six per cent. of the solution when it begins to dissolve the surface of the cellulose form, and thus to roughen it. It is better, however, to use a fresh solution of caustic soda and to apply it with aid of centrifugal action.

For example, the cellulose thread or other form to be treated is placed in the perforated drum of a centrifugal apparatus and the strong solution of caustic soda, advantageously containing less than six per cent. of ammonia, is supplied through the hollow axle under pressure while the apparatus is at work. After a short time the caustic soda is displaced by water, also passed under pressure through the hollow axle. In this manner the cellulose form becomes more transparent, clearer, stronger, and more elastic. These enhanced properties are retained if after the alkali treatment the form is treated by acid or another suitable solvent to extract the whole or a part of its copper. The duration of the immersion in or the centrifugal treatment with the alkali is determined by the thickness of the form, as the thicker it is the longer it resists penetration by the alkali.

The process is particularly applicable for making thick, highly-elastic, transparent, and unusually-strong threads and films, such as artificial horsehair, which has not hitherto been made in a single operation, embroidery-threads, and photographic films. The threads after carbonization serve as electric-light filaments and the carbonized films for telephonic purposes. To avoid deformation, the forms made according to this invention must be dried under tension, but at the ordinary temperature.

Having thus described the nature of our said invention and the best means we know of carrying the same into practical effect, we claim—

1. A process for the manufacture of threads or films of cellulose consisting in first treating a cupriferous ammoniacal solution of cellulose with a strong solution of alkali, and then immersing the separated solid product thus obtained in caustic alkali.

2. A process for the manufacture of threads or films of cellulose consisting in first treating a cupriferous ammoniacal solution of cellulose with a strong solution of alkali, and then immersing the separated solid product thus obtained in ammoniacal caustic alkali.

3. A process for the manufacture of threads or films of cellulose consisting in first treating a cupriferous ammoniacal solution of cellulose with a strong solution of an alkali and then immersing the separated solid product thus obtained in a cold solution of caustic soda of not less than twenty-per-cent. strength.

4. A process for the manufacture of threads or films of cellulose consisting in first treating a cupriferous ammoniacal solution of cellulose with a strong solution of an alkali and then immersing the separated solid product thus obtained in a cold solution of caustic soda of not less than twenty-per-cent. strength and containing not more than six per cent. of ammonia.

5. A process for the manufacture of threads or films of cellulose consisting in first treating a cupriferous ammoniacal solution of cellulose with a strong solution of alkali and then immersing the separated solid product thus obtained in caustic alkali, and finally washing the solid product and drying it under tension.

6. A process for the manufacture of threads or films of cellulose, consisting in first treating an ammoniacal cupriferous solution of cellulose with a strong solution of an alkali and then immersing the separated solid product thus obtained in a cold solution of caustic soda of not less than twenty-per-cent. strength and containing not more than six per cent. of ammonia and finally washing the solid product and drying it under tension.

7. A process for the manufacture of threads or films of cellulose consisting in first treating a cupriferous ammoniacal solution of cellulose with a strong solution of an alkali and then treating the solid product thus obtained with caustic alkali under centrifugal action.

8. A process for the manufacture of threads or films of cellulose consisting in first treating a cupriferous ammoniacal solution of cellulose with a strong solution of an alkali and then treating the solid product thus obtained with caustic alkali under centrifugal action and finally washing the solid product and drying it under tension.

9. A process for the manufacture of threads or films of cellulose consisting in first treating a cupriferous ammoniacal solution of cellulose with a strong solution of an alkali and then treating the solid product thus obtained with ammoniacal caustic alkali under centrifugal action.

10. A process for the manufacture of threads or films of cellulose consisting in first treating a cupriferous ammoniacal solution of cellulose with a strong solution of an alkali then treating the solid product thus obtained with ammoniacal caustic alkali under centrifugal action, and finally washing the solid product and drying it under tension.

11. As a new article of manufacture transparent films or thick threads of cellulose made by treating a cupriferous ammoniacal solution of cellulose with a strong solution of alkali, immersing the separated solid product thus obtained in caustic alkali, and finally washing the solid product and drying it under tension.

In testimony whereof we have signed our names to this specification in the presence of the subscribing witnesses.

MAX FREMERY.
EMIL BRONNERT.
JOHANN URBAN.

Witnesses to the signature of Max Fremery:
    HENRY QUADFLIEG,
    GERARD OELLERS.

Witnesses to the signature of Emil Bronnert:
    ALBERT GRAETER,
    GEO. GIFFORD.

Witnesses to the signature of Johann Urban:
    ALVESTO S. HOGUE,
    AUGUST FUGGER.